US008463546B2

(12) United States Patent
Rolinski et al.

(10) Patent No.: US 8,463,546 B2
(45) Date of Patent: Jun. 11, 2013

(54) METHOD AND APPARATUS FOR PROVIDING NAVIGATION SUPPORT FOR PRIVATE PREMISES

(75) Inventors: Chad C. Rolinski, San Diego, CA (US); Kam-Cheong Anthony Tsoi, San Diego, CA (US); Craig B. Lauer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 550 days.

(21) Appl. No.: 12/641,725

(22) Filed: Dec. 18, 2009

(65) Prior Publication Data
US 2011/0153190 A1 Jun. 23, 2011

(51) Int. Cl.
*G01C 21/00* (2006.01)
*G01C 21/26* (2006.01)
*G01C 21/34* (2006.01)

(52) U.S. Cl.
USPC ...... 701/533; 701/410; 701/428; 340/995.11; 340/995.19

(58) Field of Classification Search
None
See application file for complete search history.

(56) References Cited

U.S. PATENT DOCUMENTS

| 2002/0049533 A1* | 4/2002 | Kusano et al. | 701/209 |
| 2007/0118278 A1* | 5/2007 | Finn et al. | 701/208 |
| 2007/0204218 A1* | 8/2007 | Weber et al. | 715/530 |
| 2007/0242084 A1* | 10/2007 | Bowman et al. | 345/629 |
| 2008/0092061 A1* | 4/2008 | Bankston et al. | 715/748 |
| 2009/0187337 A1* | 7/2009 | Denk, Jr. | 701/201 |
| 2010/0211632 A1* | 8/2010 | Saarinen | 709/203 |

FOREIGN PATENT DOCUMENTS

DE 102005044419 A1 3/2006

OTHER PUBLICATIONS

International Search Report and Written Opinion—PCT/US2010/061115, International Search Authority—European Patent Office—Mar. 30, 2011.

* cited by examiner

*Primary Examiner* — Michael J Zanelli
(74) *Attorney, Agent, or Firm* — Ashish L. Patel; Gerald P. Joyce, III

(57) ABSTRACT

Techniques for providing navigation support for private premises are described. In an aspect, a composite map may be generated by combining a geo-coded map for public areas with another geo-coded map for a private premise. The composite map may be generated in real time and may be provided as an aid for navigation in both the public areas and the private premise. In another aspect, a geo-coded map may be dynamically determined based on the current configuration of a private premise, which may be reconfigurable over time. The geo-coded map may include improvised roadways and/or other improvised features and may be provided as an aid for navigation within the private premise. In one design, a navigation path for a destination of a vehicle may be dynamically determined based on the current configuration of the private premise and may be provided to aid navigation.

33 Claims, 7 Drawing Sheets

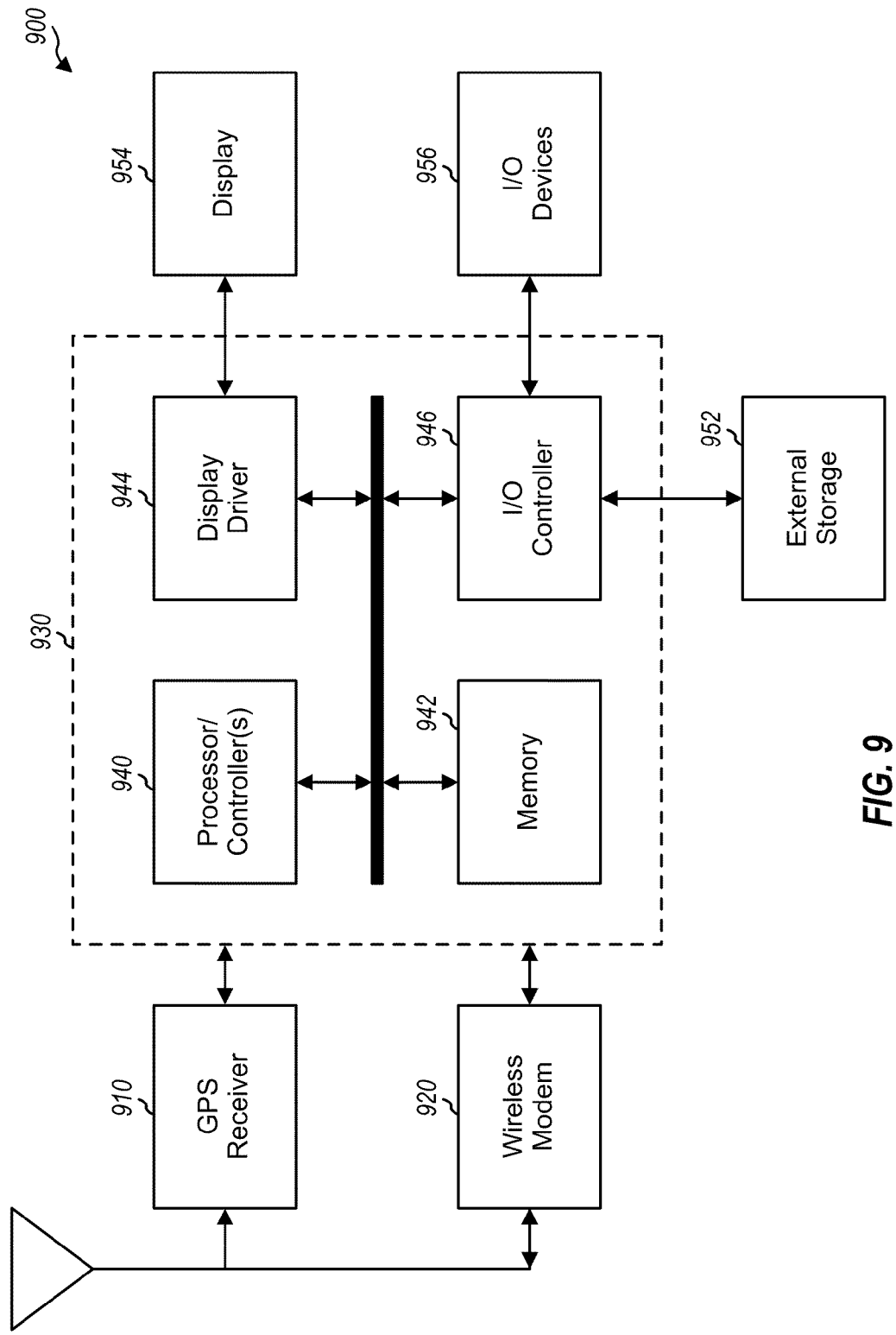

METHOD AND APPARATUS FOR PROVIDING NAVIGATION SUPPORT FOR PRIVATE PREMISES

BACKGROUND

I. Field

The present disclosure relates generally to navigation, and more specifically to techniques for providing navigation aid.

II. Background

Navigation systems are widely used in cars, trucks, and other vehicles to provide navigation aid to enable drivers to reach their destinations. A navigation system typically has a navigation database containing public streets and points of interest. Points on streets and points of interest may be encoded as geographic coded (geo-coded) coordinates, e.g., with longitude and latitude. These geo-coded coordinates may be determined manually by surveyors and stored in the navigation database. A graphical map of a given geographic area of interest may then be generated by downloading the geo-coded coordinates within the geographic area from the navigation database and constructing the graphical map based on these geo-coded coordinates. The graphical map may be used in conjunction with a positioning system, such as Global Positioning System (GPS), to provide navigation aid.

A navigation database typically covers only public areas, since these are accessible by surveyors to encode into geo-coded coordinates and are also of interest to the general public. Areas within private premises, such as shopping centers and corporate campuses, are typically not covered by the navigation database. A navigation system can normally display only public streets leading to entrances of private premises. Only the perimeter of a private premise may be geo-coded, and the navigation system may be able to display only the outline of the entire private premise. The roadways within the private premises are typically not known and hence not shown.

SUMMARY

Techniques for providing navigation support for private premises are described herein. In an aspect, a composite map may be generated by combining a geo-coded map for public areas with another geo-coded map for a private premise. The composite map can provide navigation aid for both the public areas and the private premise. In one design, a first geo-coded map of public areas may be obtained. A second geo-coded map of a private premise may also be obtained. Each geo-coded map may include geo-coded coordinates for the area covered by that map. A composite map may be generated in real time based on the first and second geo-coded maps. The composite map may be displayed as an aid for navigation.

In another aspect, a geo-coded map may be dynamically determined based on the current configuration of a private premise, which may be reconfigurable over time. The geo-coded map may include improvised roadways and/or other improvised features for the current configuration of the private premise. The geo-coded map may be provided as an aid for navigation within the private premise.

In one design, a navigation path for a vehicle may also be dynamically determined based on the current configuration of the private premise and may be provided to aid navigation. A destination within the private premise for the vehicle may be determined, e.g., in real time when the vehicle arrives at the private premise. For example, possible destinations for the vehicle may be determined when the vehicle arrives at the private premise, and the destination for the vehicle may be selected from among the possible destinations. The navigation path to the selected destination may then be determined and provided as an aid for navigation.

Various aspects and features of the disclosure are described in further detail below.

BRIEF DESCRIPTION OF THE DRAWINGS

FIG. 9 shows a block diagram of a navigation system.

DETAILED DESCRIPTION

Techniques for providing navigation support for private premises are described herein. In an aspect, a composite map may be generated by combining a geo-coded map for public areas with another geo-coded map for a private premise. The composite map can provide navigation aid for both the public areas and the private premise.

Figure 1:
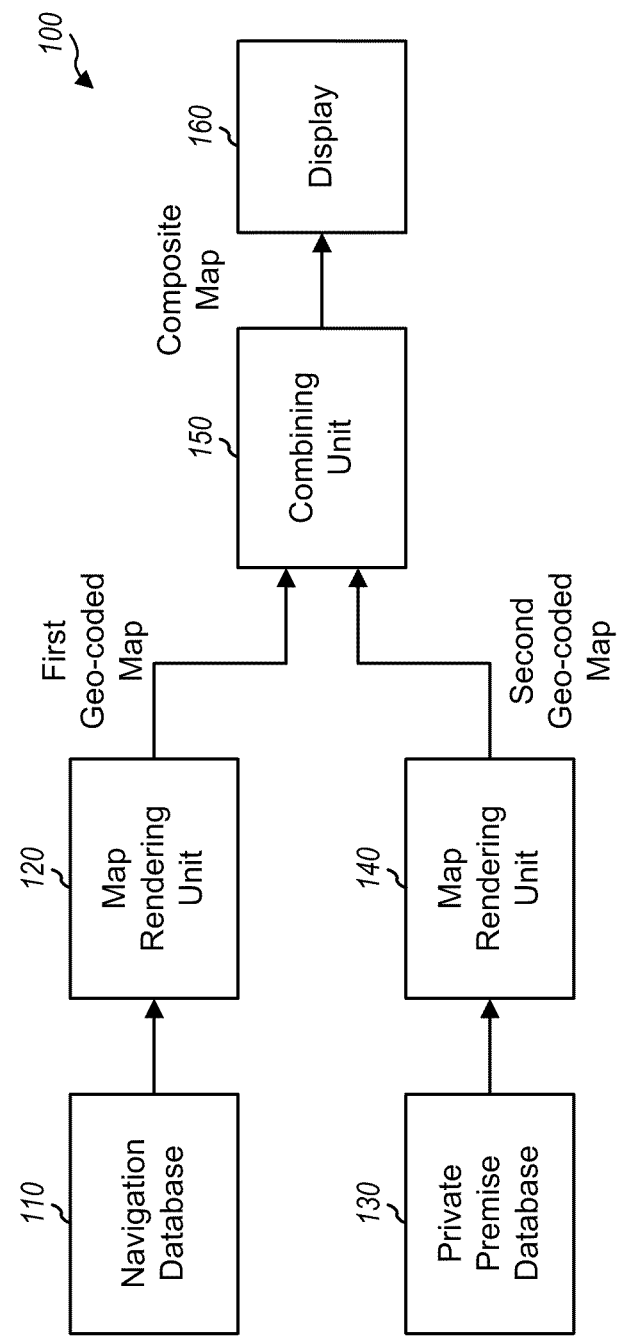
FIG. 1 shows a navigation system capable of providing navigation support for private premises.

FIG. 1 shows a design of a navigation system 100 capable of providing navigation support for private premises. Within navigation system 100, a navigation database 110 may store geo-coded coordinates for public areas, e.g., public streets and points of interest. A map rendering unit 120 may receive an indication of a first geographic area of interest and may receive geo-coded coordinates for this area from database 110. Unit 120 may render a first geo-coded map for the first geographic area. Database 110 and unit 120 may be similar to those found in commercially available navigation systems.

A private premise database 130 may store geo-coded coordinates for private premises. In general, a private premise may cover any geographic area that is not covered by a commercially available navigation database. A private premise may cover a shopping center, a large office complex, a warehouse distribution center, a college, a theme park, a gated community, etc. A map rendering unit 140 may receive an indication of a second geographic area of interest, which may overlap partially or completely with the first geographic area. For example, the second geographic area may correspond to a portion of the first geographic area covering a private premise. Unit 140 may receive geo-coded coordinates for the second geographic area from database 130 and may render a second geo-coded map for this area.

A combining unit 150 may receive the first and second geo-coded maps from map rendering units 120 and 140, respectively, and may combine the two geo-coded maps to obtain a composite map. A display unit 160 may display the composite map as an aid for navigation. All of the units in navigation system 100 may operate in real time and may generate maps when they are requested, e.g., by a driver or user of the navigation system.

FIG. 1 shows an exemplary design of navigation system 100 capable of providing navigation support for private premises. In general, a navigation system may include all or a subset of the units shown in FIG. 1 and/or other units not shown in FIG. 1. For example, a navigation system may be implemented on the network side and may include units 110 to 150 in FIG. 1 and may exclude display unit 160. This navigation system may generate composite maps and/or directions as an aid for navigation and may provide the composite maps and/or directions to a remote system, e.g., on a vehicle, a cellular phone, etc. The remote system may display and/or use the information received from the network-side navigation system.

Navigation system 100 can provide navigation support for public areas as well as private premises. Navigation database 110 may be a commercially available navigation database, which may store geo-coded coordinates for a large geographic area such as the entire United States. Map rendering unit 120 may provide the first geo-coded map in any suitable map format, e.g., any commercially available map format. For example, the first geo-coded map may show graphical rendition of geo-coded roadways in public areas. The roadways may include roads, alleys, etc.

Private premise database 130 may store geo-coded information (e.g., geo-coded coordinates) for private premises of interest to the user. This geo-coded information may be provided by owners and/or tenants of the private premises or may be obtained in other manners. Map rendering unit 140 may provide the second geo-coded map in any suitable map format. The second geo-coded map format may be the same as or different from the first geo-coded map format. In one design, the second geo-coded map may show graphical rendition of geo-coded roadways in a private premise, e.g., in the same map format as the first geo-coded map. In another design, the second geo-coded map may be a geo-coded aerial map of the private premise. In yet another design, the second geo-coded map may show a combination of graphical rendition of geo-coded roadways and a geo-coded aerial map of the private premise, e.g., with the roadways superimposed over the aerial map. The aerial map may be a satellite image or some other image and may show roadways, natural terrain, and other structures within the private premise. The second geo-coded map may also be provided in other formats.

The composite map from combining unit 150 may include both (i) geo-coded roadways in public areas from the first geo-coded map and (ii) geo-coded roadways and/or a geo-coded aerial map of a private premise from the second geo-coded map. The user/driver may see graphical rendition of roadways when located within the public areas. The user/driver may see graphical rendition of roadways and/or an aerial map when located within the private premise. Combining unit 150 may combine a graphical map and an aerial map (e.g., a satellite image) using any commercially available technology that can calibrate an aerial image and annotate roadways for vehicle movements and direction.

Figure 2:
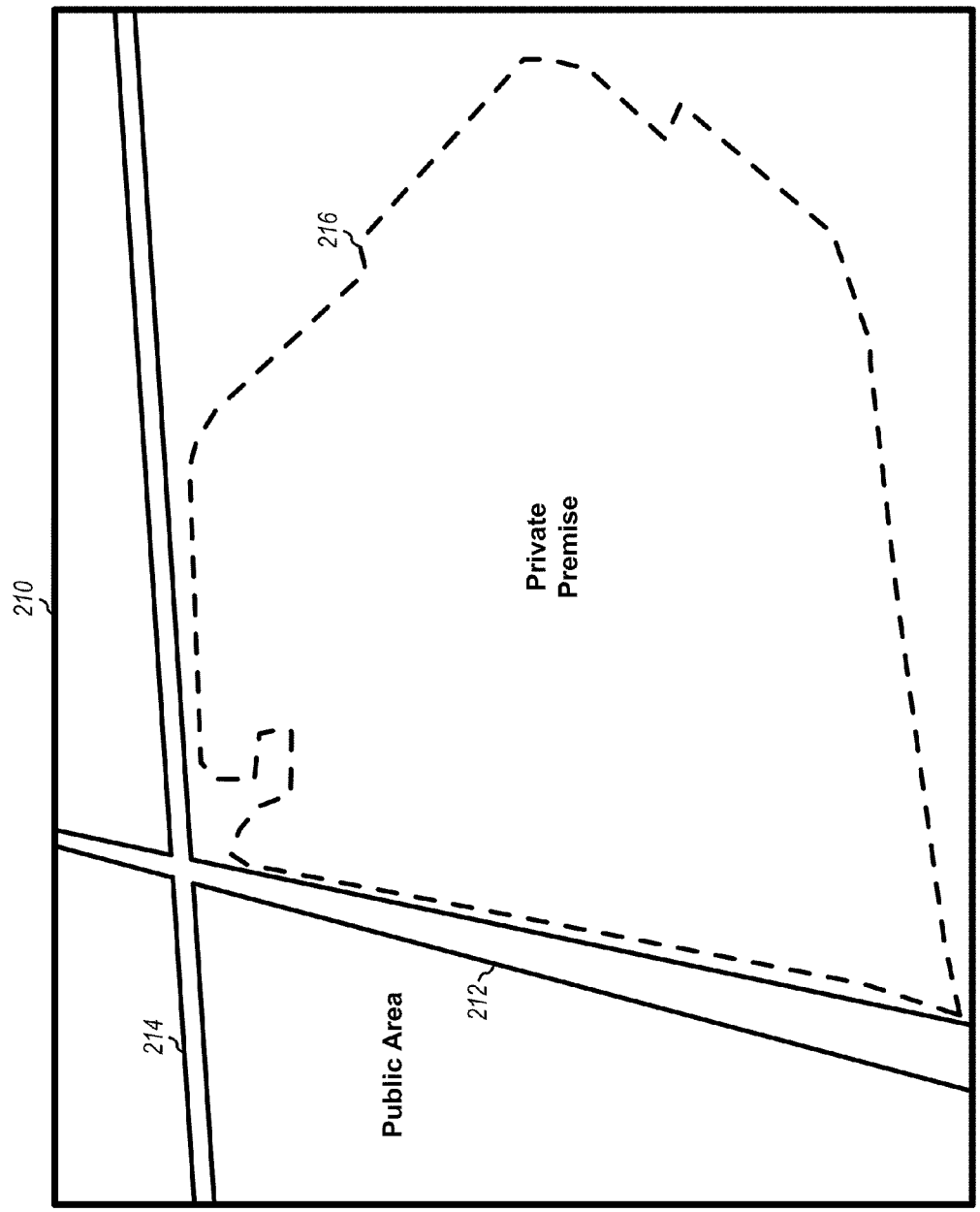
FIG. 2 shows a geo-coded map of public areas.

FIG. 2 shows an example of a geo-coded map 210 of public areas. In this example, geo-coded map 210 shows graphical rendition of two roads 212 and 214 in the public areas and an outline 216 of a private premise. No information or map data is available in the navigation database for the private premise. Consequently, a user/driver would receive no navigation support within the private premise.

Figure 3:
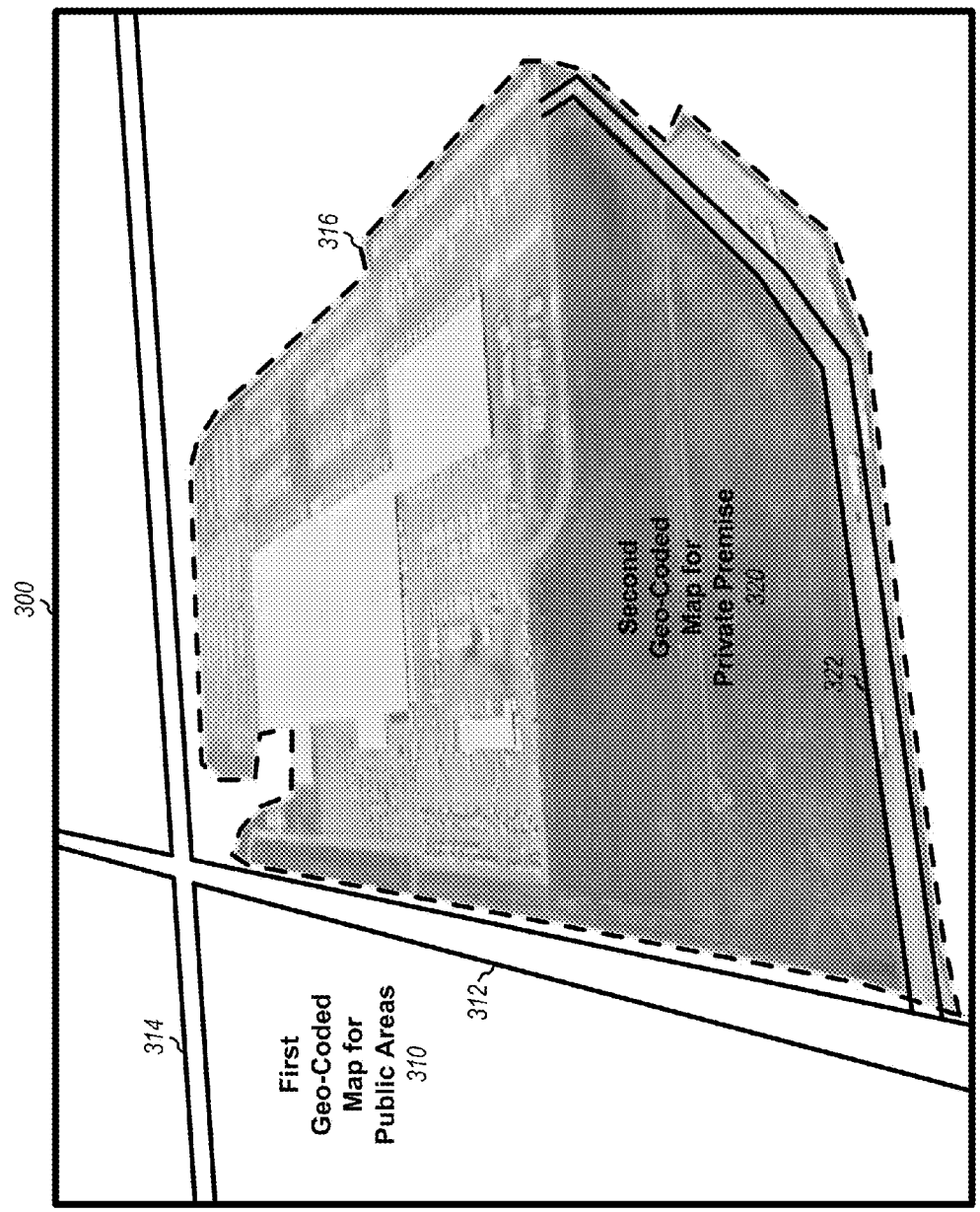
FIG. 3 shows a composite map of public areas and a private premise.

FIG. 3 shows an example of a composite map 300 of public areas and a private premise. In this example, composite map 300 is formed by combining a first geo-coded map 310 of the public areas and a second geo-coded map 320 of the private premise. The first geo-coded map 310 shows graphical rendition of two roads 312 and 314 in the public areas and an outline 316 of the private premise. The second geo-coded map 320 shows graphical rendition of a road 322 and an aerial map of the private premise. A user/driver can receive navigation support from the first geo-coded map 310 when in the public areas. The user/driver can receive navigation support from the second geo-coded map 320 when in the private premise.

Figure 4:
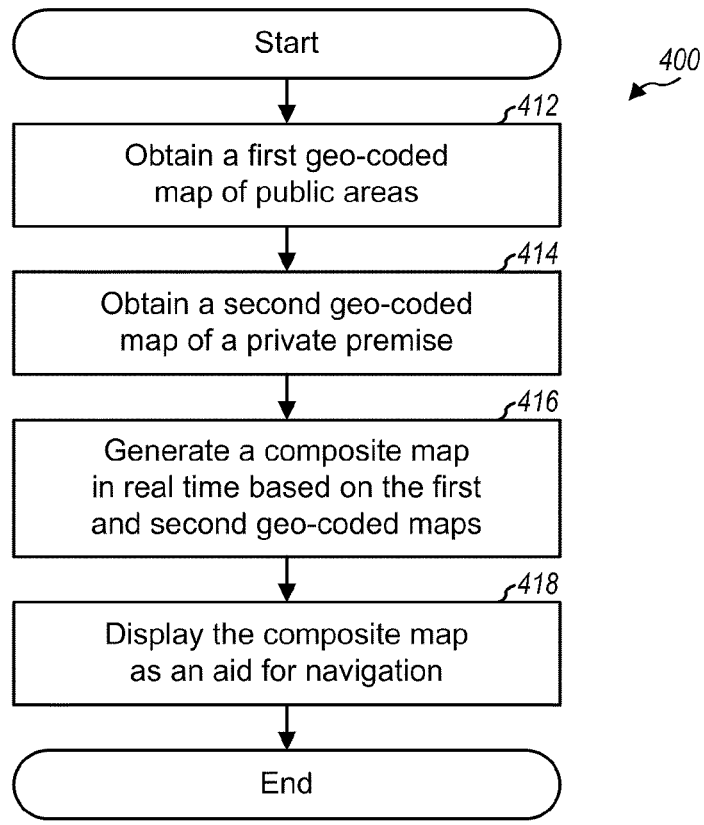
FIG. 4 shows a process for supporting navigation in a private premise.

FIG. 4 shows a design of a process 400 for supporting navigation in a private premise. A first geo-coded map of public areas may be obtained (block 412). The first geo-coded map may be generated based on geo-coded information from a commercially available navigation database. A second geo-coded map of the private premise may also be obtained (block 414). Block 412 may be performed prior to block 414, or vice versa. The private premise may cover a shopping center, a large office complex, a warehouse distribution center, a college, a theme park, a gated community, etc. The second geo-coded map of the private premise may be unavailable for commercial purchase and may be generated based on geo-coded information from an owner or tenant of the private premise. The first and second geo-coded maps may comprise the same type of map, e.g., graphical maps. Alternatively, the first and second maps may comprise different types of maps. For example, the first geo-coded map may comprise a graphical map and the second geo-coded map may comprise an aerial map, e.g., a satellite image.

A composite map may be generated in real time based on the first and second geo-coded maps (block 416). For block 416, a geographic area to be displayed for navigation may be determined, e.g., based on the current location of the vehicle. In one design, a determination may be made that the geographic area includes at least a portion of the private premise, e.g., based on at least one geo-coded coordinate in the second geo-coded map. The composite map may then be generated based on both the first and second geo-coded maps, e.g., with the second geo-coded map overlaying the first geo-coded map, or vice versa. The composite map may be generated based the portion of the first geo-coded map and the portion of the second geo-coded map covering the geographic area. The first geo-coded map may comprise graphical rendition of the geographic area, and the second geo-coded map may comprise an aerial map of the private premise. The composite map may comprise the aerial map of the private premise overlaying the graphical rendition of the geographic area, or vice versa.

In another design, a determination may be made that the geographic area to be displayed does not include the private premise. The composite map may then be generated based on only the first geo-coded map. In yet another design, a determination may be made that the geographic area to be displayed does not include the public areas. The composite map may then be generated based on only the second geo-coded map. For all designs, the composite map may be displayed as an aid for navigation (block 418).

The first geo-coded map of the public areas may overlap with the second geo-coded map of the private premise, and there may be a conflict in the overlap. For example, one geo-coded map may show the private area as a rectangle whereas the other geo-coded map may show the private area as a trapezoid. In case of conflict, the first geo-coded map may take precedence over the second geo-coded map, or vice versa.

A composite map comprising both a first geo-coded map of public areas and a second geo-coded map of a private premise may be useful in various scenarios. For example, a trucking company may provide services inside and outside of private premises. A driver of the trucking company may rely on a navigation system that can guide the driver only to the entrances of the private premises. Thereafter, within the private premises, the driver may rely on a paper map and/or driving instructions obtained from a separate source. For this driver, it would be very useful if the information about roadways within the private premises can be integrated with the public roadways in the navigation system. This would then allow the driver to use the same navigation system from end to end. The techniques described herein can enable such integration and can provide navigation support for the driver within the private premises.

In another aspect, a geo-coded map may be dynamically determined based on the current configuration of a private premise and may be provided to aid navigation. The private premise may be reconfigurable over time. The geo-coded map may then change with the configuration of the private premise. The destination of a vehicle and/or the available roadways may be dependent on the current configuration of the private premise. In one design, a navigation path for the vehicle may be dynamically determined based on the destination for the vehicle and the available roadways for the current configuration of the private premise. The navigation path may be provided to aid navigation.

Figure 5:
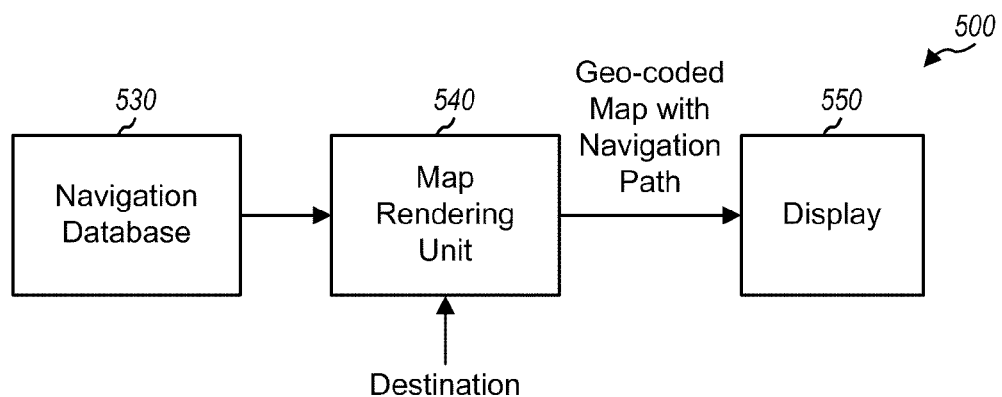
FIG. 5 shows a navigation system capable of dynamically determining a geo-coded map and a navigation path for the current configuration of a private premise.

FIG. 5 shows a design of a navigation system 500 capable of dynamically determining a geo-coded map and a navigation path for the current configuration of a private premise. Within navigation system 500, a private premise database 530 may store geo-coded information for the current configuration of the private premise. The geo-coded information in database 530 may be updated whenever there is a change in the configuration of the private premise. A map rendering unit 540 may receive the geo-coded information from database 530 and an indication of a desired destination for a vehicle. The destination may be configurable and may be dependent on the current configuration of the private premise, as described below. Unit 540 may generate a geo-coded map of the private premise. Unit 540 may operate in real time and may generate the geo-coded map with the latest available geo-coded information from database 530 when the map is requested, e.g., by the driver. Unit 540 may further determine a navigation path from the current location of the vehicle to the desired destination. The navigation path may be highlighted in the geo-coded map and/or may be used to guide the driver to the destination, e.g., via voice instructions generated by navigation system 500 for the driver. A display unit 550 may display the geo-coded map and possibly the navigation path as an aid for navigation.

Navigation system 500 may be useful in various scenarios, and some exemplary scenarios are described below. In a first exemplary scenario, a distribution center of a big retail company may have many loading docks for incoming vehicles. Which particular loading docks are available for incoming vehicles may depend on the time of the day, and the schedule may or may not be the same everyday. In one design, each possible receiving location (e.g., loading dock) for an incoming vehicle may have sensors to detect whether that receiving location is occupied and possibly a navigation path leading to the receiving location. A central system may receive inputs from the sensors for all possible receiving locations and may be able to determine which receiving locations are available for incoming vehicles in real time.

When an incoming vehicle arrives at the distribution center, the central system may first select an available receiving location that can be used for the incoming vehicle. In one design, the central system may determine the navigation path and/or driving instructions to the selected receiving location. The central system may then send a geo-coded map for the distribution center and the navigation path and/or driving instructions to the incoming vehicle. In this design, the central system may include database 530 and map rendering unit 540 in FIG. 5. The incoming vehicle may include display unit 550 to display the geo-coded map and the navigation path and/or driving instructions received from the central system. In another design, the central system may simply send geo-coded information that can be used to generate a geo-coded map for the distribution center as well as geo-coded coordinates of the selected receiving location to the incoming vehicle. The incoming vehicle may then generate a geo-coded map for the distribution center and determine the navigation path and/or driving instructions for the selected receiving location based on the geo-coded information received from the central system. In this design, the incoming vehicle may include database 530, map rendering unit 540, and display unit 550 in FIG. 5.

Figure 6:
FIG. 6 shows a geo-coded map with a navigation path.

FIG. 6 shows an example of a geo-coded map 620 of a private premise with a navigation path to aid navigation. Geo-coded map 620 may be combined with a geo-coded map for public areas (as shown in FIG. 6) or may be displayed alone (not shown in FIG. 6). Geo-coded map 620 shows graphical rendition of a road 622 and an aerial map of the private premise. Geo-coded map 620 further shows a navigation path 630 from the current location 632 of an incoming vehicle to a destination 634 for the vehicle. The driver may use navigation path 630 as an aid to reach destination 634.

The destination for the incoming vehicle may be dependent on the current configuration of the private premise, e.g., dependent on the available receiving locations for the incoming vehicle. For example, destination 634 may be selected if the incoming vehicle arrives at the private premise at a given time (e.g., 11:53 AM). Another destination 644 may be selected if the incoming vehicle arrives at the private premise at another time (e.g., 5:07 PM). In this case, a navigation path 640 (shown by a heavy dashed line) from the current location 632 of the incoming vehicle to destination 644 may be determined and displayed on the geo-coded map. In general, different destinations and hence different navigation paths may be determined for the incoming vehicle for different arrival times.

In a second exemplary scenario, a private premise (e.g., a shopping center, a parking garage, or a theme park) may have many parking spots. Which particular parking spots are available for incoming vehicles may change over time. In one design, each possible parking spot may have sensors to detect whether that parking spot is occupied and possibly a navigation path leading to the parking spot. A central system may receive inputs from the sensors for all parking spots and may be able to determine which parking spots are available for incoming vehicles in real time.

When an incoming vehicle arrives at the private premise, the central system may first select an available parking spot for the vehicle. In one design, the central system may determine the navigation path and/or driving instructions to the selected parking spot. The central system may then send a geo-coded map for the private premise and the navigation path and/or driving instructions to the incoming vehicle. The incoming vehicle may display the geo-coded map and the navigation path and/or driving instructions received from the central system. In another design, the central system may simply send geo-coded information that can be used to generate a geo-coded map for the private premise as well as geo-coded coordinates of the selected parking spot to the incoming vehicle. The incoming vehicle may then generate a geo-coded map for the private premise and determine the navigation path and/or driving instructions for the selected parking spot based on the geo-coded information received from the central system. For both designs, the incoming vehicle may be equipped with a compatible system that can be guided to the selected parking spot.

In a third exemplary scenario, a private premise may be reconfigured for different uses over time. For example, the private premise may be used as a large parking lot in one week, as a music festival with a stadium, a make-shift restaurant, and a smaller parking lot in another week, etc. A geo-coded map may be generated for each configuration of the private premise and may show improvised roads and improvised location for parking. The geo-coded map for the current configuration of the private premise may be provided in real time to incoming vehicles as aid for navigation. Navigation paths may also be provided to the incoming vehicles if their destinations are known. The destinations may be dependent on the geo-coded map for the current configuration of the private premise.

For the first and second exemplary scenarios described above, the geo-coded map of the private premise may be relatively static, but the destinations may change dynamically over time. The current configuration of the private premise may be defined by which particular destinations are available. A navigation path may be dependent on a selected destination, which may be dependent on the current configuration of the private premise or the currently available destinations.

For the third exemplary scenario described above, the geo-coded map of the private premise may change over time and may include different improvised roads and improvised parking locations for different configurations. When the configuration of the private premise changes, geo-coded information for that current configuration may be obtained, e.g., by determining the geo-coded coordinates of the improvised roads and parking locations. The geo-coded information may be used to generate an up-to-date geo-coded map for the current configuration of the private premise. The geo-coded map for the current configuration may be provided as aid for navigation. Alternatively, the geo-coded map as well as a navigation path may be provided as aid for navigation.

In an exemplary design, reservation of map data space may be used to reflect changes in a geo-coded map. Reservation of map data space may be useful in various scenarios. For example, in the second exemplary scenario described above, it may be desirable to avoid routing multiple vehicles to the same parking spot. To avoid this, a map of available parking spots may be determined and presented to a user in an incoming vehicle. The user may view the map and may select/mark an available parking spot that the user intends occupy. The selected parking spot for this incoming vehicle may be reserved for a given period of time, which may be of any suitable duration. The selected parking spot may be removed from the maps of available parking spots generated for other incoming vehicles. Reservation of map data space may also be used in other scenarios.

In general, a geo-coded map (e.g., a graphical map or an aerial map) may be generated for a private premise based on the current configuration of the private premise and may be provided to incoming vehicles. The available roadways in the private premise and/or the destinations for the incoming vehicles may change for different configurations of the private premise. By sending information for the up-to-date geo-coded map and possibly a navigation path for an incoming vehicle in real time, a driver can more easily navigate through the private premise and/or reach the desired destination.

Figures 7, 8:
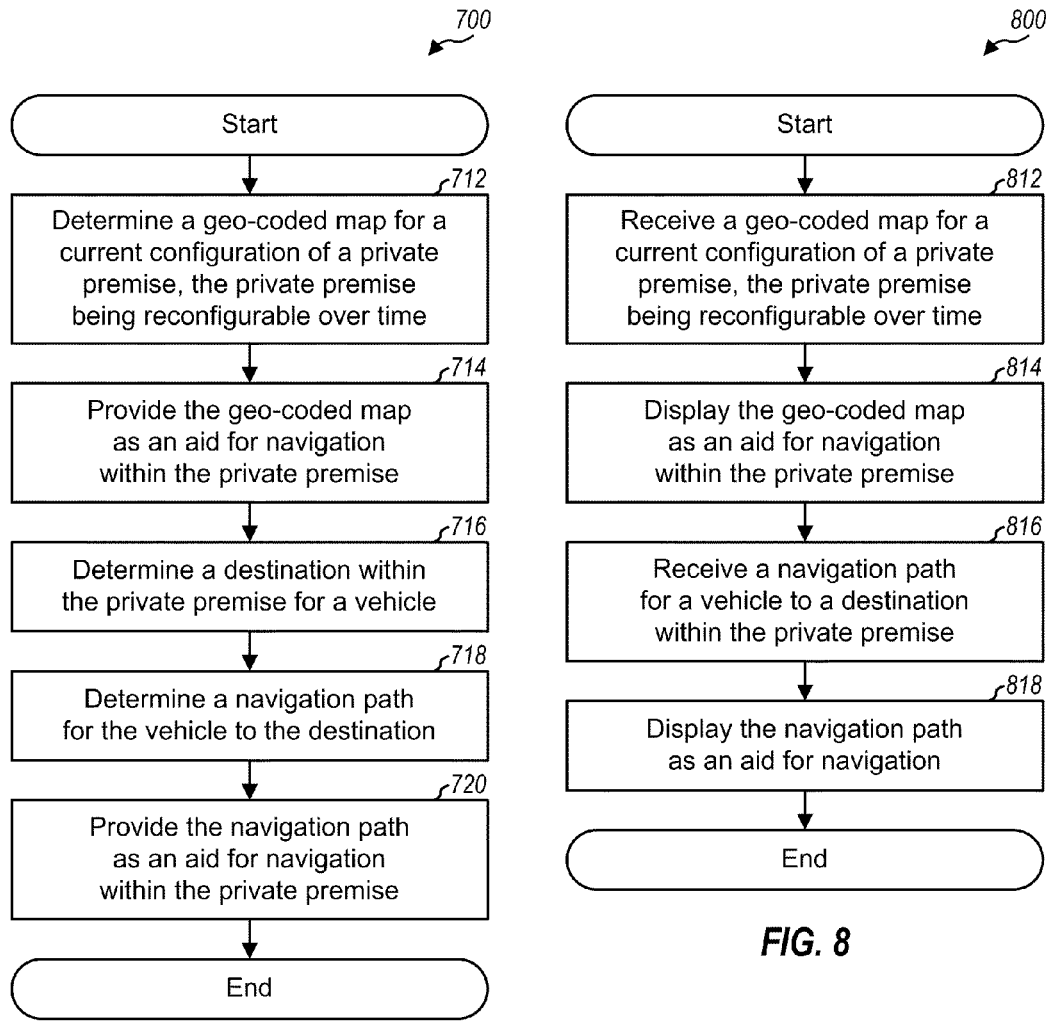
FIGS. 7 and 8 show two processes for supporting navigation.

FIG. 7 shows a design of a process 700 for supporting navigation in a private premise. Process 700 may be performed by a system external to navigation systems in vehicles. A geo-coded map for the current configuration of the private premise, which may be reconfigurable over time, may be determined (block 712). The geo-coded map may be provided as an aid for navigation within the private premise (block 714).

In one design, the geo-coded map may include improvised roadways and/or other improvised features (e.g., parking lots) for the current configuration of the private premise. The improvised roadways may be different for different configurations of the private premise.

In one design, a destination within the private premise for a vehicle may be determined (block 716). The destination for the vehicle may be dynamic (i.e., may vary with time) and may be dependent on traffic load, location of roadways, location of parking areas, and/or other conditions within the private premise. The destination for the vehicle may be determined in real time when the vehicle arrives at the private premise. For example, possible destinations (e.g., receiving stations or parking spots) for the vehicle may be determined when the vehicle arrives at the private premise. The destination for the vehicle may then be selected from among the possible destinations. The destination for the vehicle may be determined by an automated system for the private premise, and not by a driver of the vehicle. In any case, a navigation path for the vehicle to the destination may be determined (block 718). The navigation path may be provided as an aid for navigation within the private premise (block 720).

In one design, a determination may first be made whether the vehicle is authorized to receive the geo-coded map for the current configuration of the private premise. This determination may be based on whether the vehicle is authorized to enter the private premise. The geo-coded map may be provided to the vehicle only if it is authorized.

FIG. 8 shows a design of a process 800 for supporting navigation in a private premise. Process 800 may be performed by a navigation system in a vehicle. A geo-coded map for the current configuration of the private premise, which may be reconfigurable over time, may be received (block 812). The geo-coded map may be displayed as an aid for navigation within the private premise (block 814). In one design, the geo-coded map may include improvised roadways for the current configuration of the private premise. The improvised roadways may be different for different configurations of the private premise.

In one design, a navigation path for the vehicle to a destination within the private premise may be received (block 816). The destination for the vehicle may be dynamic and may be determined in real time when the vehicle arrives at the private premise. The navigation path may also be displayed as an aid for navigation (block 818). The navigation path may be used to guide the vehicle to the destination.

The techniques for providing navigation support for private premises described herein may provide various advantages. The techniques may be able to provide end-to-end navigation aid for both public areas and private premises with one navigation system. A geo-coded map for a private premise may be delivered to a vehicle, e.g., in real time when the vehicle approaches the private premise. A navigation system in the vehicle may use the geo-coded map to help the driver to navigate within the private premise. The layout within the private premise may change over time, e.g., such as in a distribution center that contains many loading docks or a theme parks in which some parking lots may be more available than others depending on the time of the day. A central system may collect information regarding the current configuration of the private premise, e.g., the available roadways, the available destinations, etc. The central system may send geo-coded information for a geo-coded map and possibly a navigation path to a vehicle, e.g., in real time when the vehicle reaches the perimeter of the private premise. The geo-coded map and navigation path may greatly reduce time and effort for the vehicle to reach its destination.

The techniques described herein may be especially useful for the trucking industry. Trucks that provide services inside and outside private premises can rely on one system for end-to-end navigation. The techniques may also be useful in other industries and scenarios, some of which are described above.

FIG. 9 shows a block diagram of a navigation system 900 that can provide navigation support for private premises. Navigation system 900 may be a stand-alone system dedicated to support navigation. Navigation system 900 may also be part of another system, e.g., a wireless communication device, a cellular phone, a personal digital assistance (PDA), etc.

Within navigation system 900, a GPS receiver 910 may support positioning to determine the current location of the navigation system. GPS receiver 910 may receive and process signals from satellites and may provide timing and/or pseudo-range measurements for the satellites to a digital section 930. Processor/controller(s) 940 within digital section 930 may determine the current location of navigation system 900 based on the measurements from GPS receiver 910. A wireless modem 920 may support communication with one or more wireless communication systems such as a Code Division Multiple Access (CDMA) system, a Global System for Mobile Communications (GSM) system, a wireless local area network (WLAN) system, etc. Wireless modem 920 may support downloading of geo-coded information for private premises in real time.

Within digital section 930, processor/controller(s) 940 may perform processing for various functions. For example, processor/controller(s) 940 may generate geo-coded maps based on a navigation database and/or geo-coded information for private premises. Processor/controller(s) 940 may also generate composite maps for both public areas and private premises. Processor/controller(s) 940 may implement map rendering units 120 and 140 and combining unit 150 in FIG. 1. Processor/controller(s) 940 may also implement map rendering unit 540 in FIG. 5. Processor/controller(s) 940 may also direct the operation of various processing and interface units within digital section 930. A memory 942 may store program code and data, e.g., geo-coded information.

An input/output (I/O) controller 946 may interface with an external storage 952 and I/O devices 956. External storage 952 may store a navigation database for public areas, geo-coded information for private areas, etc. I/O devices 956 may support interaction with a user/driver, e.g., receive inputs from the user and provide voice instructions to the user. A display controller 944 may perform tasks to facilitate display of composite maps and geo-coded maps on a display unit 954. Display unit 954 may be a liquid crystal display (LCD) or some other type of display unit that can display geo-coded maps.

Digital section 930 may be implemented with one or more digital signal processors (DSPs), micro-processors, reduced instruction set computer (RISC) processors, etc. Digital section 930 may also be fabricated on one or more application specific integrated circuits (ASICs) and/or other integrated circuits (ICs).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting navigation, comprising:
   obtaining a first geo-coded map of public areas;
   obtaining a second geo-coded map of a private premise;
   generating a composite map in real time based on the first and second geo-coded maps;
   displaying the composite map as an aid for navigation;
   determining possible navigation paths to a destination for a vehicle in the second geo-coded map; and
   determining whether the vehicle is authorized to receive the second geo-coded map for a current configuration of the private premise.

2. The method of claim 1, wherein the first and second geo-coded maps comprise different types of maps.

3. The method of claim 1, wherein the first geo-coded map comprises a graphical map and the second geo-coded map comprises an aerial map.

4. The method of claim 1, wherein the composite map comprises the second geo-coded map overlaying the first geo-coded map, or vice versa.

5. The method of claim 1, wherein the generating the composite map comprises
   determining a geographic area to be displayed for navigation,
   determining that the geographic area includes at least a portion of the private premise based on at least one geo-coded coordinate in the second geo-coded map, and
   generating the composite map based on both the first and second geo-coded maps.

6. The method of claim 5, wherein the first geo-coded map comprises graphical rendition of the geographic area, wherein the second geo-coded map comprises an aerial map of the private premise, and wherein the composite map comprises the aerial map of the private premise overlaying the graphical rendition of the geographic area, or vice versa.

7. The method of claim 1, wherein the generating the composite map comprises
   determining a geographic area to be displayed for navigation,
   determining that the geographic area does not include the private premise, and
   generating the composite map based on only the first geo-coded map.

8. The method of claim 1, wherein the generating the composite map comprises
   determining a geographic area to be displayed for navigation,
   determining that the geographic area does not include the public areas, and
   generating the composite map based on only the second geo-coded map.

9. An apparatus for supporting navigation, comprising:
   means for obtaining a first geo-coded map of public areas;
   means for obtaining a second geo-coded map of a private premise;
   means for generating a composite map in real time based on the first and second geo-coded maps;
   means for displaying the composite map as an aid for navigation;
   means for determining possible navigation paths to a destination for a vehicle in the second geo-coded map; and
   means for determining whether the vehicle is authorized to receive the second geo-coded map for a current configuration of the private premise.

10. The apparatus of claim 9, wherein the first geo-coded map comprises a graphical map and the second geo-coded map comprises an aerial map.

11. The apparatus of claim 9, wherein the means for generating the composite map comprises
    means for determining a geographic area to be displayed for navigation,
    means for determining that the geographic area includes at least a portion of the private premise based on at least one geo-coded coordinate in the second geo-coded map, and
    means for generating the composite map based on both the first and second geo-coded maps.

12. An apparatus for supporting navigation, comprising:
    at least one processor configured to obtain a first geo-coded map of public areas,
    to obtain a second geo-coded map of a private premise, to generate a composite map in real time based on the first and second geo-coded maps, to display the composite map as an aid for navigation, to determine possible navigation paths to a destination for a vehicle in the second geo-coded map, and to determine whether the vehicle is authorized to receive the second geo-coded map for a current configuration of the private premise.

13. The apparatus of claim 12, wherein the first geo-coded map comprises a graphical map and the second geo-coded map comprises an aerial map.

14. The apparatus of claim 12, wherein the at least one processor is configured to determine a geographic area to be displayed for navigation, to determine that the geographic area includes at least a portion of the private premise based on at least one geo-coded coordinate in the second geo-coded map, and to generate the composite map based on both the first and second geo-coded maps.

15. A computer program product, comprising:
    a computer-readable medium comprising:
    code for causing at least one computer to obtain a first geo-coded map of public areas,
    code for causing the at least one computer to obtain a second geo-coded map of a private premise,
    code for causing the at least one computer to generate a composite map in real time based on the first and second geo-coded maps,
    code for causing the at least one computer to display the composite map as an aid for navigation, code for determining possible navigation paths to a destination for a vehicle in the second geo-coded map, and code for determining whether the vehicle is authorized to receive the second geo-coded map for a current configuration of the private premise.

16. A method of supporting navigation, comprising:
determining a geo-coded map for a current configuration of a private premise, the private premise being reconfigurable over time;
determining whether a vehicle is authorized to receive the geo-coded map for the current configuration of the private premise; and
providing the geo-coded map as an aid for navigation within the private premise when the vehicle is authorized.

17. The method of claim 16, wherein the geo-coded map includes improvised roadways for the current configuration of the private premise, the improvised roadways being different for different configurations of the private premise.

18. The method of claim 16, further comprising:
determining a destination within the private premise for a vehicle;
determining a navigation path for the vehicle to the destination; and
providing the navigation path as an aid for navigation within the private premise.

19. The method of claim 18, wherein the destination for the vehicle is dynamic and determined in real time when the vehicle arrives at the private premise.

20. The method of claim 18, wherein the determining the destination comprises
determining possible destinations for the vehicle when the vehicle arrives at the private premise, and
selecting the destination for the vehicle from among the possible destinations.

21. The method of claim 18, wherein the destination for the vehicle is dependent on traffic load, location of roadways, location of parking areas, or a combination thereof within the private premise.

22. The method of claim 18, wherein the destination for the vehicle is determined by an automated system for the private premise and is not determined by a driver of the vehicle.

23. The method of claim 16, wherein the determining whether the vehicle is authorized to receive the geo-coded map comprises determining whether the vehicle is authorized to enter the private premise.

24. An apparatus for supporting navigation, comprising:
means for determining a geo-coded map for a current configuration of a private premise, the private premise being reconfigurable over time;
means for determining whether a vehicle is authorized to receive the geo-coded map for the current configuration of the private premise; and
means for providing the geo-coded map as an aid for navigation within the private premise when the vehicle is authorized.

25. The apparatus of claim 24, wherein the geo-coded map includes improvised roadways for the current configuration of the private premise, the improvised roadways being different for different configurations of the private premise.

26. The apparatus of claim 24, further comprising:
means for determining a destination within the private premise for a vehicle;
means for determining a navigation path for the vehicle to the destination; and
means for providing the navigation path as an aid for navigation within the private premise.

27. The apparatus of claim 26, wherein the means for determining the destination comprises
means for determining possible destinations for the vehicle when the vehicle arrives at the private premise, and
means for selecting the destination for the vehicle from among the possible destinations.

28. A method of supporting navigation, comprising:
obtaining a first geo-coded map of public areas, wherein the first geo-coded map comprises a graphical map;
obtaining a second geo-coded map of a private premise, wherein the second geo-coded map comprises an aerial map;
generating a composite map in real time based on the first and second geo-coded maps;
displaying the composite map as an aid for navigation; and
determining possible navigation paths to a destination for a vehicle in the second geo-coded map.

29. The method of claim 28, wherein the generating the composite map comprises
determining a geographic area to be displayed for navigation,
determining that the geographic area includes at least a portion of the private premise based on at least one geo-coded coordinate in the second geo-coded map, and
generating the composite map based on both the first and second geo-coded maps.

30. The method of claim 29, wherein the first geo-coded map comprises graphical rendition of the geographic area, and wherein the composite map comprises the aerial map of the private premise overlaying the graphical rendition of the geographic area, or vice versa.

31. An apparatus for supporting navigation, comprising:
means for obtaining a first geo-coded map of public areas, wherein the first geo-coded map comprises a graphical map;
means for obtaining a second geo-coded map of a private premise, wherein the second geo-coded map comprises an aerial map;
means for generating a composite map in real time based on the first and second geo-coded maps;
means for displaying the composite map as an aid for navigation; and
means for determining possible navigation paths to a destination for a vehicle in the second geo-coded map.

32. An apparatus for supporting navigation, comprising:
at least one processor configured to:
obtain a first geo-coded map of public areas, wherein the first geo-coded map comprises a graphical map,
obtain a second geo-coded map of a private premise, wherein the second geo-coded map comprises an aerial map,
generate a composite map in real time based on the first and second geo-coded maps,
display the composite map as an aid for navigation, and
determine possible navigation paths to a destination for a vehicle in the second geo-coded map.

33. A computer program product, comprising:
a computer-readable medium comprising:
code for causing at least one computer to obtain a first geo-coded map of public areas, wherein the first geo-coded map comprises a graphical map,
code for causing the at least one computer to obtain a second geo-coded map of a private premise, wherein the second geo-coded map comprises an aerial map,
code for causing the at least one computer to generate a composite map in real time based on the first and second geo-coded maps, code for causing the at least one computer to display the composite map as an aid for navigation, and code for determining possible navigation paths to a destination for a vehicle in the second geo-coded map.

* * * * *